(No Model.)
J. CONWAY.
VEHICLE AXLE NUT LOCK.
No. 319,791. Patented June 9, 1885.
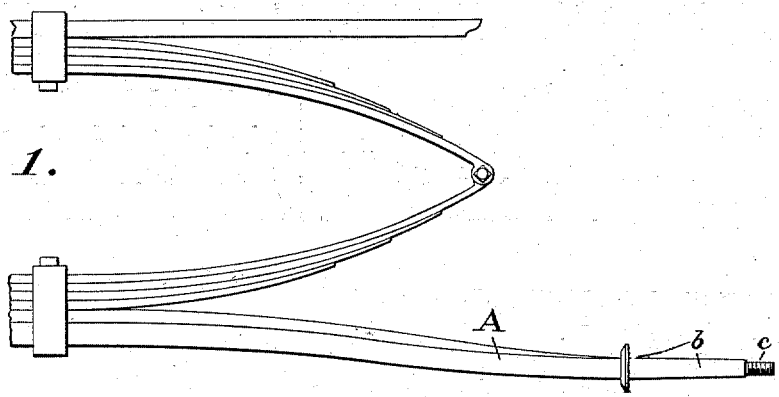
Fig. 1.
Fig. 2.
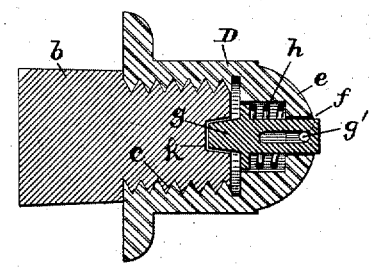
Fig. 3.
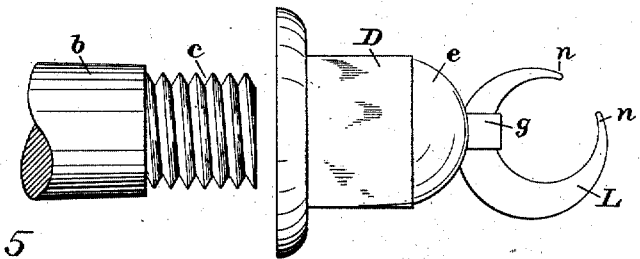
Fig. 5.
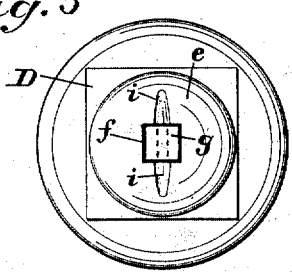
Fig. 4.
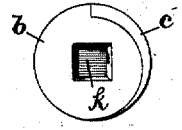
WITNESSES:
Edward A. Osse.
John E. Morris.
INVENTOR:
Jesse Conway
By Chas. B. Mann
Attorney.

United States Patent Office.

JESSE CONWAY, OF BALTIMORE, MARYLAND, ASSIGNOR OF ONE-HALF TO JOHN H. CONWAY, OF SAME PLACE.

VEHICLE-AXLE NUT-LOCK.

SPECIFICATION forming part of Letters Patent No. 319,791, dated June 9, 1885.

Application filed April 16, 1885. (No model.)

*To all whom it may concern:*

Be it known that I, JESSE CONWAY, a citizen of the United States, residing at Baltimore in the State of Maryland, have invented certain new and useful Improvements in Vehicle-Axle Nut-Locks, of which the following is a specification.

My invention relates to improved means for preventing axle-nuts from accidentally coming off.

The axle-arm on which the wheel turns is provided at the end with a screw-thread, and a nut on the thread serves to retain the wheel on the axle-arm. It is the object of this invention to provide means for confining this nut in order that it may not accidentally come off.

The invention is illustrated in the accompanying drawings, in which Figure 1 shows an axle of a vehicle of the kind to which my invention is applied. Fig. 2 is a section of axle arm and nut, showing the improvement. Fig. 3 is a side view of axle arm, nut, and key. Fig. 4 is an end view of the axle-arm. Fig. 5 is a front view of the nut.

The axle A has the arm $b$, on which the hub of the wheel turns. At the end of the axle-arm is the usual screw, $c$, and the wheel when on the arm is retained by the nut D. The nut has a crown, $e$, provided with a central hole, $f$, of some polygonal form, preferably four-sided, as shown. The crown of the nut may be rounded or flat. A short bolt, $g$, occupies the central hole in the crown, and a spring, $h$, on the inner side of the nut-crown $e$, operates to press the bolt inward or toward the axle-arm. The outer end of the short bolt has a slot, $g'$, to receive the point of a suitable key, by means of which it may be retracted or drawn out. The outer side of the nut-crown $e$ has a groove, $i$, extending crosswise, with which the slot $g'$ in the bolt coincides. By this construction, the end of the bolt may be flush with the outside of the crown $e$, and the point of the key may be passed along the groove $i$, and thereby enter the slot $g'$ of the bolt, upon which the latter may be retracted.

The end of the axle-arm has a central socket, $k$, of the same form or having the same number of sides as the short bolt $g$. The socket may have four, six, or more sides. The number of sides is immaterial, the object of the sides being to prevent the short bolt from turning in the socket.

When the nut D is in position on the thread $c$, the short bolt $g$ will occupy the socket $k$, and when the bolt is in this position it will confine the nut to the screw-thread and prevent it accidentally coming off.

A key of some suitable shape must be employed to retract the bolt from the socket and to hold it out while screwing the nut on or off. In the present instance a crescent-shaped key, L, is employed. (See Fig. 3.) This key is widest at the center, and therefrom gradually tapers both ways to the two points $n$. Either one of these points may be entered in the slot $g'$ of the bolt, the other point at the same time serving as a handle or grasp part by which to force it into the slot. As the key gradually widens from the points to the center, the effect of forcing it into the slot of the bolt is to retract the said bolt. When the bolt is thus withdrawn, the nut may be turned to screw it on or off the axle-arm. This form of key affords a special advantage in that it may be inserted without difficulty, although the rim of the wheel-hub may project beyond the nut. Substantially the crescent shape of key may be preserved without its having two points. One point is sufficient. It is immaterial what shape the other end has. While this key has advantages, other forms may be used.

Having described my invention, I claim and desire to secure by Letters Patent of the United States—

1. A vehicle-axle having a screw-thread and in its end a socket, in combination with a nut having a crown and provided with a central bolt to enter the said socket and confine the nut to the screw-thread, as set forth.

2. A vehicle-axle having a screw-thread and in its end a socket, in combination with a nut having a crown and provided with a central bolt and a spring to press the bolt into the said socket, and thereby confine the nut to the screw-thread, as set forth.

3. The combination of an axle-arm having a screw-thread and in its end a socket, a nut having a crown with a central hole, and a bolt provided in its outer end with a slot and passing through the central hole into the socket, as set forth.

4. The combination of an axle-arm having a screw-thread and in its end a socket, a nut having a crown with a central hole, and a groove extending crosswise, and a bolt provided in its outer end with a slot and passing through the central hole into the socket, as set forth.

5. The combination of an axle-arm having a screw-thread and in its end a socket of polygonal form, a nut having a crown and a spring, and a polygonal-shaped bolt provided with a slot, as set forth.

6. The combination of an axle-arm having a screw-thread and in its end a socket, a nut having a crown, a bolt passing from the crown into the said socket and provided with a slot, and a key having substantially a crescent shape with a point at one end, as set forth.

In testimony whereof I affix my signature in presence of two witnesses.

JESSE CONWAY.

Witnesses:
JNO. T. MADDOX,
JOHN E. MORRIS.

It is hereby certified that in Letters Patent No. 319,791, granted June 9, 1885, upon the application of Jesse Conway, of Baltimore, Maryland, for an improvement in "Vehicle-Axle Nut-Locks," the name of the assignee of one-half interest in said invention, was written and printed "John H. Conway," whereas it should have been *John N. Conway;* that the proper corrections have been made in the files and records pertaining to the case in the Patent Office, and should be read in the Letters Patent to make the same conform thereto.

Signed, countersigned, and sealed this 23d day of June, A. D. 1885.

[SEAL.]

H. L. MULDROW,
*Acting Secretary of the Interior.*

Countersigned:
    M. V. MONTGOMERY,
        *Commissioner of Patents.*